Patented Nov. 27, 1928.

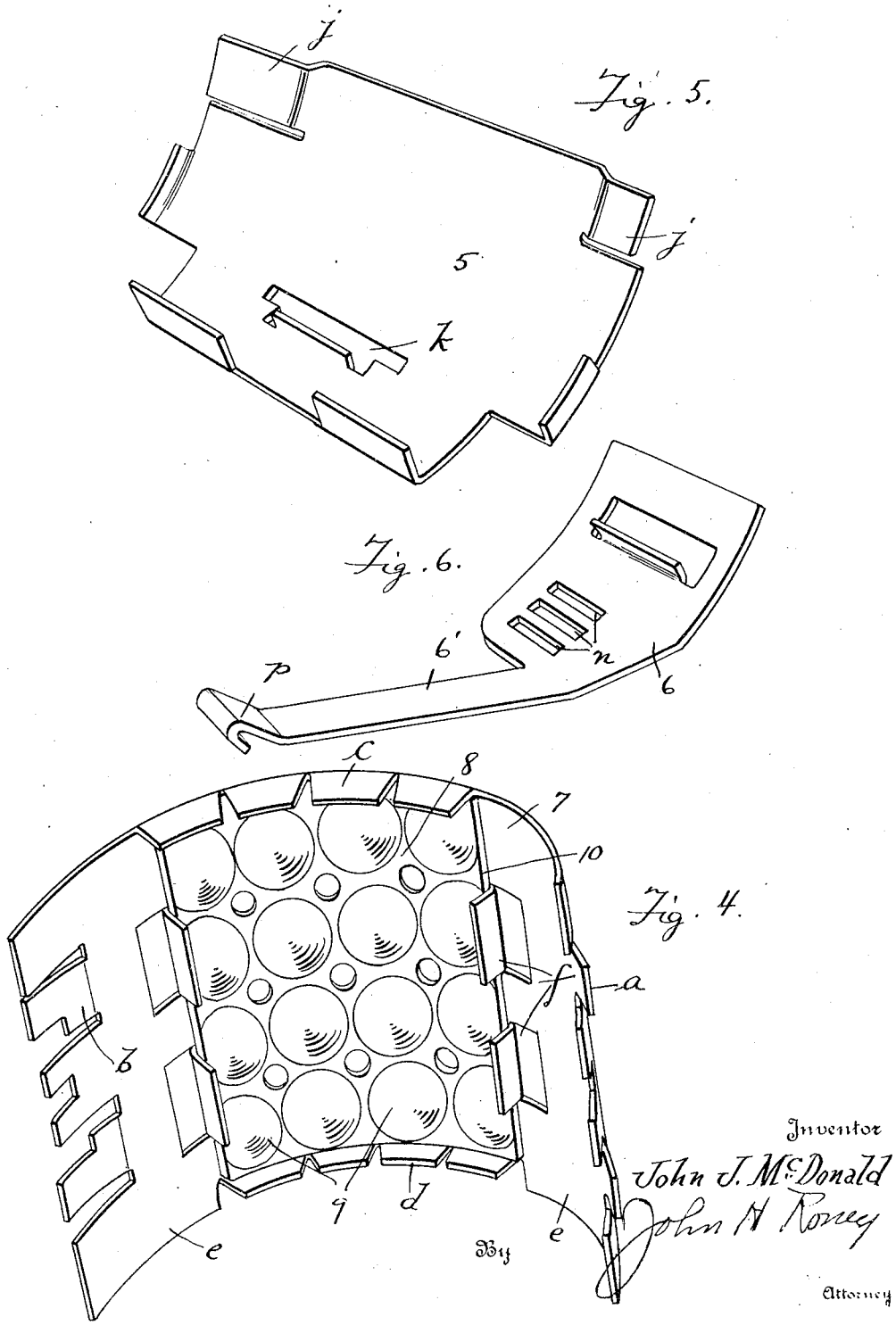

1,692,850

UNITED STATES PATENT OFFICE.

JOHN J. McDONALD, OF WESTVIEW, PENNSYLVANIA.

TIRE PROTECTOR.

Application filed May 18, 1925. Serial No. 30,930

My invention relates to improvements in protectors for pneumatic tires. The object of the invention is to produce a flexible metallic shield adapted to surround the tire and effectually protect the same against liability of puncture, without lessening in any material degree the cushioning effect obtained with a pneumatic tire. Another object of the invention is to prevent contact between the tire and the protector except at the tread portion of the tire, at which point the tire contacts with the rubber semi-spherical discs secured in the protector, as shown in Figure 1, whereby the protector is spaced apart from the tire forming space around the tire in which air circulating serves as a medium to cool the tire and at the same time this construction holds the protector out of harmful frictional contact with the tire, thus preserving the tire against excessive wear.

I accomplish these several objects by means of the device hereinafter described, which broadly stated consists of a series of interlocking flexible metallic sections, each of which comprises a series of interlocking metallic members in the tread portion of which rubber segments are firmly secured and form the wearing surface of the protector. The said device is hereinafter more specifically described, reference being had to the accompanying drawings forming part hereof in which:

Figure 4, is a perspective plan of the base plate and plate 7 secured thereto;

Figure 5, is an inverted perspective view of plate 5;

Figure 6, is a perspective view of the fastening straps.

Figure 1:
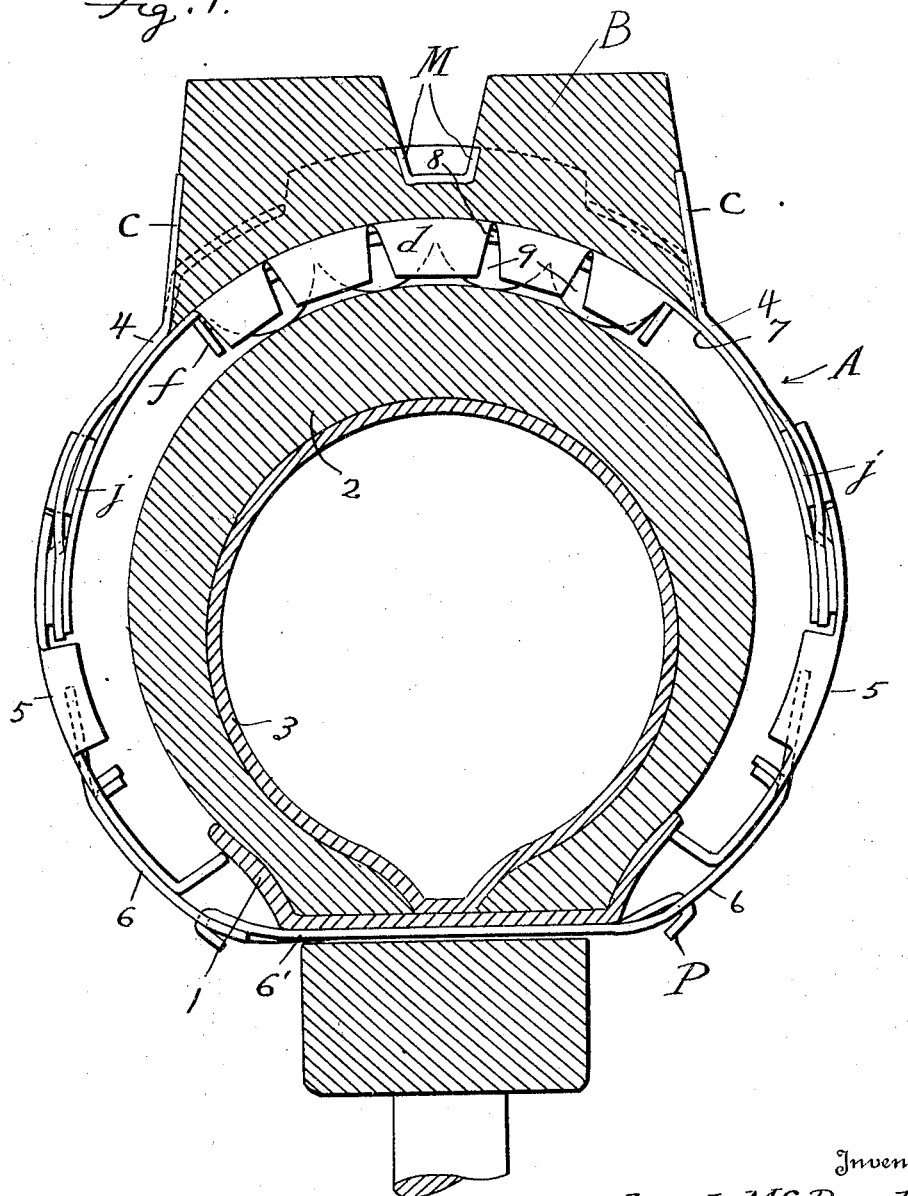
Figure 1, is a transverse section of the pneumatic tire showing a portion of the demountable rim with my improved protector secured thereto.

Referring to said drawing, 1 is the demountable rim of any usual construction upon which is adapted to be secured in any suitable manner the usual rubber tire 2, within which is located the usual inner pneumatic tube 3. A, is my improved tire protector, which is adapted to surround and completely enclose the rubber shoe 2, and which consists of a series of flexible interlocking sections each of which is formed of a plurality of interlocking metallic members 4, 5, 5, 6, 6, and 7, all of said metallic members being adapted to be interlocked and formed into one section of the series of similar sections which form a substantially integral annular shield adapted to enclose and completely surround the exterior surface of the rubber shoe or tire 2. The said members are interlocked and formed into a unitary structure as follows:

Member 7, which I term the base member, comprises a metallic plate having along the ends thereof, fingers $a$, $b$, and on each of its sides vertically disposed fingers, $c$, $d$, one side of said member at each end thereof is provided with extensions $e$, $e$, formed along the edge thereof adjacent to the fingers $d$, which are slightly depressed below the plane of the main body of the plate so as to maintain the body portion of all the plates when assembled upon the same plane. The said member is also provided with fingers $f$, $f$, which with fingers, $c$, $d$, constitute the holding means to firmly secure the plate 8 upon the member 7. The said plate 8, has mounted thereon a series of semi-spherical members 9, formed of rubber which are spaced spaced apart as shown for the purpose of providing air spaces therebetween, and the surface of the rubber shoe or tire 2 adapted to rest thereon, and also serves to prevent frictional contact between the tire and the protector except at the tread portion of the tire. The said plate 8 has a marginal flange 10, against which the fingers $c$, $d$, and $f$, $f$, are adapted to be bent for the purpose of holding said plate securely upon the section 7. It will be noted that the middle semi-spherical members 9 are somewhat higher than the end members. The member 4, consists of a metallic plate, the middle portion of which substantially conforms in shape to the letter S, having at each end extensions $g$, $g$. Vertically disposed slots $h$, $h$, are formed in each of said extensions, also laterally disposed slots $i$, $i$. The slots $h$, $h$, are for the reception of correspondingly formed fingers, $j$, $j$, formed in the members 5, whereby when the said fingers are inserted in said slots, the two sections are firmly interlocked. The said sections 5 are symmetrical, the outer ends having formed therein slots $k$, $k$, each adapted to receive a correspondingly formed finger $6'$, on the inner end of the member 6, whereby the two members are interlocked firmly together.

Figure 2:
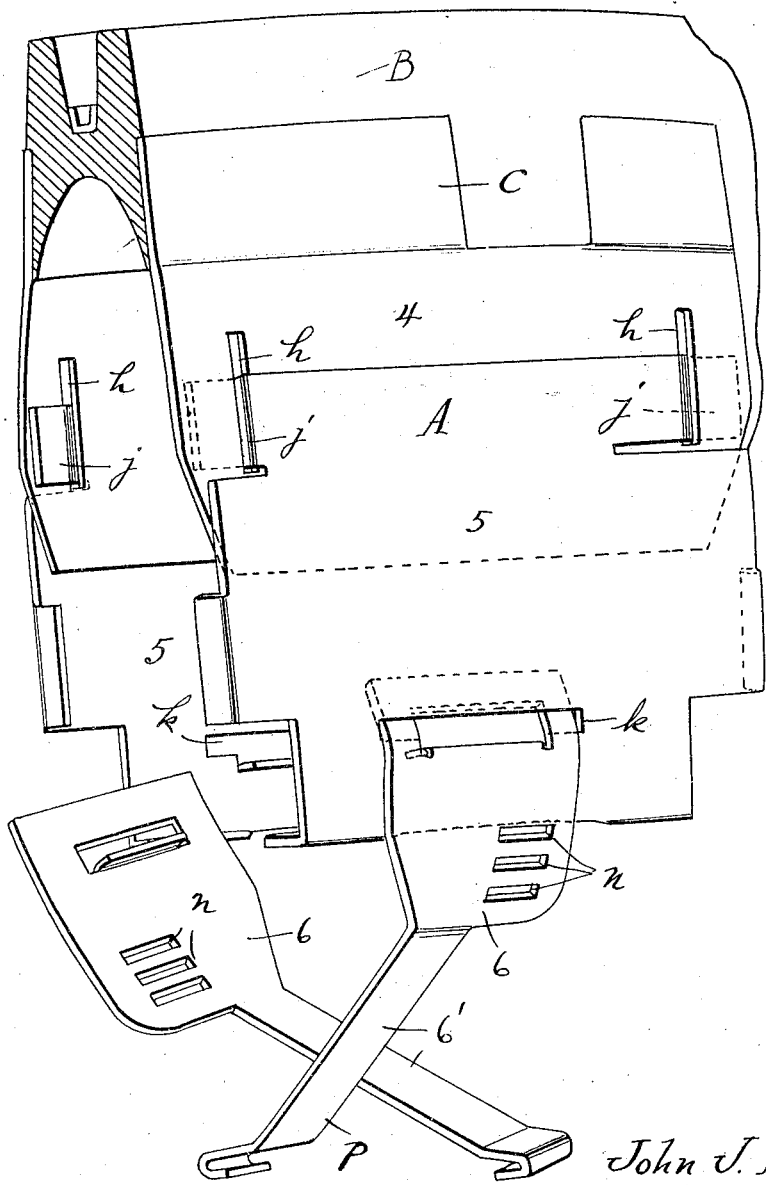
Figure 2, is a perspective side elevation of one complete section or unit of the protector.
Figure 3:
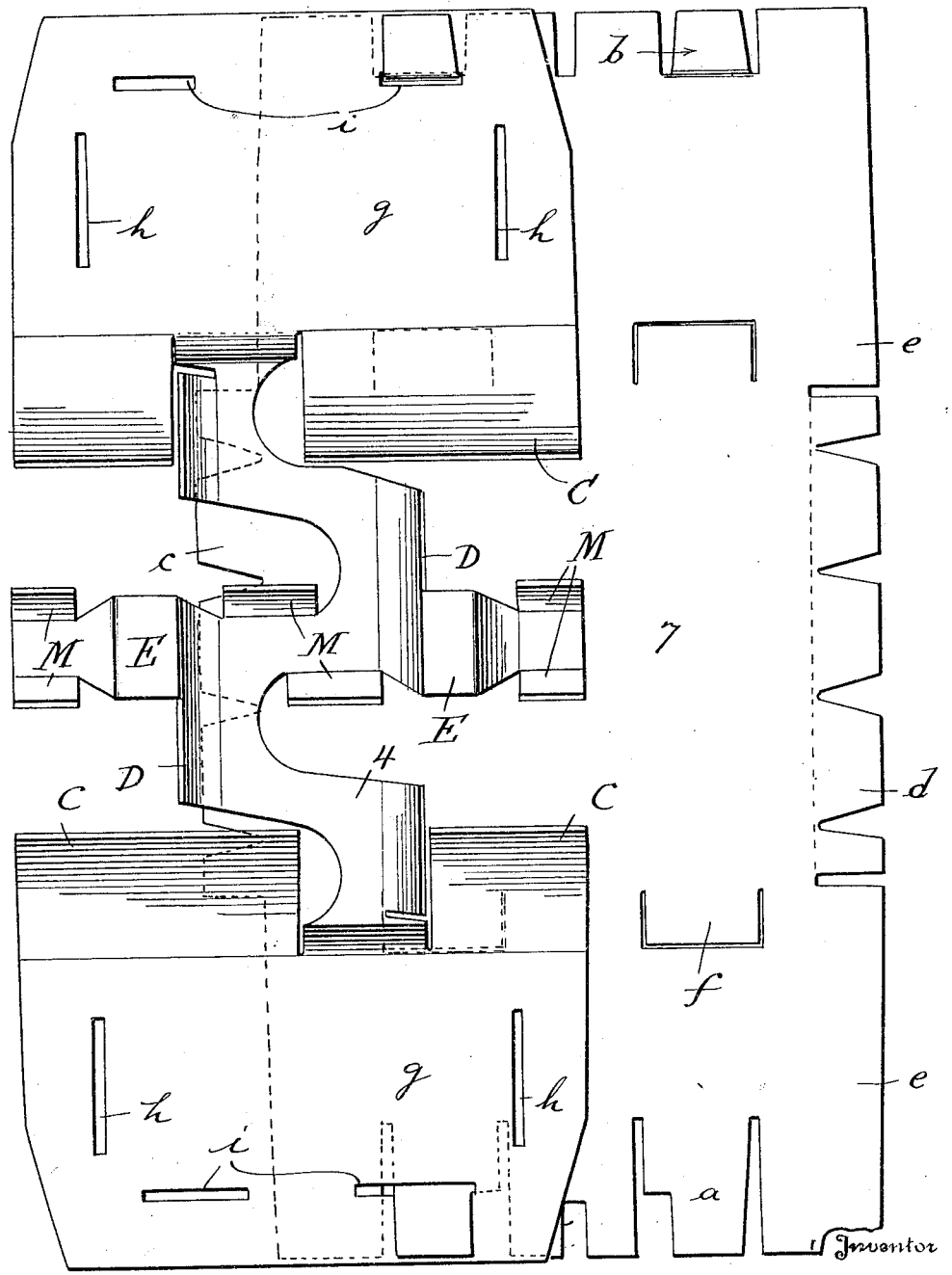
Figure 3, is a developed plan view of the plate 7.

The said member 6, constitutes a strap for the purpose of securing the protector as an entirety to the demountable rim, each of said straps having in their widest portion slots n, n, in which the narrow ends p, p, are adapted to be interlocked. It will be noted upon inspection of Figures 1, 2 and 3, that members 4 and 5, which are arranged in end to end relation, are placed upon the member 7 with the latter projecting an appreciable distance beyond one side of the members 4 and 5. When the various sections of the tire protector are connected together, they are arranged side by side with the projecting portion of the plate 7 just mentioned arranged beneath the members 4 and 5 of the adjacent section, so that the fingers a and b at the ends of the member 7 can be arranged within the adjacent slots i formed in the extensions g of the member 4 of the adjacent section. In this manner all of the sections of the protector are interlocked side by side as will be readily understood.

The member 4 is provided with flanges C which are arranged parallel with the extensions g, while the intermediate S-shaped portion of the member 4 is also provided with somewhat similar flanges D, the latter mentioned flanges being arranged in pairs, and also disposed with relation to the flanges C to permit the rubber tread elements or segments B to be frictionally held and properly supported therebetween as clearly illustrated in Figure 1. The fingers M, M, also assist in holding the segments in place.

Having described my invention what I claim and desire to secure by Letters Patent is:

1. In a pneumatic tire protector, an annular shield surrounding the same and comprising a plurality of sections arranged side by side, each section including a base member, a tread member arranged on the base member and including a substantially S-shaped intermediate portion, means arranged on the inner side of the base member and disposed to engage the tread of the tire for spacing the protector therefrom, means for attaching the section in an applied position and connected with said tread member, said means including interlocking straps, and interlocking cooperating means carried by the base member of one section and the tread member of the adjacent section, whereby said sections are connected together in overlapping relation.

2. In a pneumatic tire protector, an annular shield surrounding the same comprising a plurality of sections arranged side by side, each section including a base member, flanges projecting inwardly from the inner side of the member, a plate supported between said flanges, a series of semi-spherical yieldable members carried by said plate and arranged to engage the tread of the tire for spacing the protector therefrom, a tread member arranged on the outer side of the base, means having interlocking association with the tread member for attaching the section in an applied position, and means whereby the base member of one section is interlocked with the tread member of the adjacent section in overlapping relation.

In testimony whereof, I have hereunto signed my name.

JOHN J. McDONALD.